US009636623B2

United States Patent
Kula et al.

(10) Patent No.: US 9,636,623 B2
(45) Date of Patent: May 2, 2017

(54) MULTILAYER COMPOSITE FOR REVERSIBLE SORPTION OF MERCURY AND METHOD FOR SORPTION AND DESORPTION OF MERCURY FROM A GASEOUS PHASE

(71) Applicant: POLITECHNIKA ŁÓDZKA, Łódź (PL)

(72) Inventors: Piotr Kula, Łódź (PL); Robert Pietrasik, Brzeziny (PL); Malgorzata Iwona Szynkowska, Łódź (PL); Ewa Leśniewska, Łódź (PL); Jacek Góralski, Katarzynów (PL); Piotr Niedzielski, Stryków (PL); Jadwiga Albińska, Łódź (PL); Slawomir Szafran, Sieradz (PL); Tomasz Maniecki, Łódź (PL)

(73) Assignee: POLITECHNIKA LODZKA, Lodz (PL)

( * ) Notice: Subject to any disclaimer, the term of this patent is extended or adjusted under 35 U.S.C. 154(b) by 237 days.

(21) Appl. No.: 14/440,905

(22) PCT Filed: Nov. 6, 2013

(86) PCT No.: PCT/PL2013/000141
§ 371 (c)(1),
(2) Date: May 6, 2015

(87) PCT Pub. No.: WO2014/073996
PCT Pub. Date: May 15, 2014

(65) Prior Publication Data
US 2015/0283496 A1    Oct. 8, 2015

(30) Foreign Application Priority Data

Nov. 7, 2012  (PL) .......................... 401501

(51) Int. Cl.
| | |
|---|---|
| *B01D 53/02* | (2006.01) |
| *B01D 53/04* | (2006.01) |
| *B01D 53/64* | (2006.01) |
| *B01J 20/32* | (2006.01) |
| *B01J 20/34* | (2006.01) |
| *B01J 20/02* | (2006.01) |
| *B01D 53/96* | (2006.01) |

(52) U.S. Cl.
CPC ......... *B01D 53/0407* (2013.01); *B01D 53/02* (2013.01); *B01D 53/64* (2013.01); *B01J 20/0229* (2013.01); *B01J 20/0274* (2013.01); *B01J 20/0285* (2013.01); *B01J 20/3204* (2013.01); *B01J 20/3236* (2013.01); *B01J 20/3289* (2013.01); *B01J 20/3433* (2013.01); *B01J 20/3458* (2013.01); *B01J 20/3483* (2013.01); *B01D 53/96* (2013.01); *B01D 2251/60* (2013.01); *B01D 2253/1128* (2013.01); *B01D 2256/10* (2013.01); *B01D 2257/602* (2013.01); *B01D 2258/0283* (2013.01); *B01D 2259/4009* (2013.01)

(58) Field of Classification Search
CPC ........ B01D 2251/60; B01D 2253/1128; B01D 2256/10; B01D 2257/602; B01D 2258/0283; B01D 2259/4009; B01D 53/02; B01D 53/0407; B01D 53/64; B01D 53/96; B01J 20/0229; B01J 20/0274; B01J 20/0285; B01J 20/3204; B01J 20/3236; B01J 20/3289; B01J 20/3433; B01J 20/3458; B01J 20/3483
See application file for complete search history.

(56) References Cited

U.S. PATENT DOCUMENTS

| | | | |
|---|---|---|---|
| 3,961,031 A | 6/1976 | Yasui et al. | |
| 4,094,777 A | 6/1978 | Sugier et al. | |
| 5,401,393 A | 3/1995 | Whitehurst et al. | |
| 6,248,217 B1 | 6/2001 | Biswas et al. | |
| 6,328,939 B1 | 12/2001 | Amrhein | |
| 6,576,092 B2 | 6/2003 | Granite et al. | |
| 7,507,083 B2 | 3/2009 | Comrie | |
| 7,858,061 B2 | 12/2010 | Varma et al. | |
| 8,025,160 B2 | 9/2011 | Wang et al. | |
| 8,110,163 B2 | 2/2012 | Keiser et al. | |
| 8,236,185 B2 | 8/2012 | Iannicelli | |
| 2003/0116503 A1* | 6/2003 | Wang ................... | B01D 69/141 210/660 |
| 2004/0228781 A1* | 11/2004 | Tonkovich ......... | B01D 53/0446 422/222 |
| 2006/0205591 A1 | 9/2006 | Lee et al. | |
| 2008/0307960 A1 | 12/2008 | Hendrickson et al. | |
| 2009/0062119 A1 | 3/2009 | Olson et al. | |
| 2009/0117019 A1 | 5/2009 | Comrie | |
| 2010/0018395 A1 | 1/2010 | Srinivasachar et al. | |
| 2012/0135214 A1 | 5/2012 | Dawes et al. | |

FOREIGN PATENT DOCUMENTS

| | | |
|---|---|---|
| PL | 218635 B1 | 1/2015 |
| WO | 2010/061212 A1 | 6/2010 |
| WO | 2010/084337 A1 | 7/2010 |

OTHER PUBLICATIONS

Feb. 21, 2014 International Search Report issued in International Application No. PCT/PL2013/000141.

(Continued)

*Primary Examiner* — Christopher P Jones
(74) *Attorney, Agent, or Firm* — Oliff PLC

(57) ABSTRACT

A multilayer composite for reversible sorption of mercury, with a carrier core made of a metal or an alloy based on transition metals, has isolating layers of a transition metal nitride and externally located sorptive layers, made of a mixture of sulfides and nitrides of transition metals, the layers being deposited on both sides of the core. A method for sorption of mercury from a gaseous phase during an exposition of the multilayer composite to the influence of multicomponent gaseous mixtures that contain mercury vapors or compounds for a time period of 0.5 to 24 hours, while the temperature of the multilayer composite is maintained in the range from 20 to 150° C.

11 Claims, No Drawings

(56) References Cited

OTHER PUBLICATIONS

May 12, 2015 International Preliminary Report on Patentability issued in International Application No. PCT/PL2013/000141.

* cited by examiner

MULTILAYER COMPOSITE FOR REVERSIBLE SORPTION OF MERCURY AND METHOD FOR SORPTION AND DESORPTION OF MERCURY FROM A GASEOUS PHASE

The invention relates to a multilayer composite for reversible sorption of mercury and a method for sorption and desorption of mercury from a gaseous phase.

Mercury occurs in the Earth's crust in an amount of 0.05 ppm; it may be detected in small amounts in all geological strata. Natural sources of mercury emission are rocks, volcanic activity and reemission from water and land ecosystems. The largest emitters of mercury are currently power plants or combined heat and power plants fired with coal. A high emission of mercury is caused by a very specific structure of carriers of electric energy and heat. In 2005, about 90% of electric energy was produced by burning hard and brown coals. As geological deposits, coals are exposed to dissociation of mercury from adjacent rocks, and they also exhibit a heterogeneous chemical composition, leading to the occurrence of impurities and local differences in concentration.

U.S. Pat. No. 3,961,031 (1976) discloses a method for removal of mercury from a gas containing sulfur dioxide by washing it with an aqueous thiourea solution in order to absorb mercury vapours selectively.

U.S. Pat. No. 6,328,939 (2001) discloses a method for capture and reduction of mercury contents in industrial gases originating from the combustion of fossil fuels or solid waste by introduction of a chelating agent, i.e. EDTA (HEDTA, DTPA and/or NTA) into the scrubber, preventing reduction of oxidised mercury to elemental mercury, thereby increasing the efficiency of mercury removal in wet scrubbers.

U.S. Pat. No. 8,110,163 (2012) discloses a method for capture and reduction of heavy metal contents, including mercury, in industrial gases originating from combustion of fossil fuels or solid waste by introduction of polydithiocarbamates to the scrubber.

U.S. Pat. No. 6,576,092 (2008) discloses a method for removal of mercury from a gaseous stream by application of a low-pressure mercury lamp emitting ultraviolet (UV) radiation, in the presence of which $H_2O_2$, HCl, $NO_2$, $CO_2$, $SO_2$ oxidise mercury. Patent description No. PL 387124 (2009) discloses a method for removal of nitrogen oxides and mercury from flue gas, consisting in injection of water to the flue before a desulfurization system, with the water decreasing the flue gas temperature to 55-65° C. and causing formation of $H_2SO_3$ droplets before the absorber, accompanied by a decrease of $SO_2$ contents in the purified flue gas. The decrease in flue gas temperature enables oxidation of NO to $NO_2$ by an oxidiser ($H_2O_2$, $O_3$, $ClO_2$). Drops of nitric acid, together with drops of $H_2SO_3$, are transferred to an absorber and react with $CaCO_3$ there. Nitric acid formed as a result of the above reactions oxidises the mercury contained in the flue gas.

U.S. Pat. No. 4,094,777 (1978) discloses a method for absorption of mercury from a gas or a liquid using a bed in the form of copper(II) sulfide on various matrices (silica, aluminium oxide, silica-aluminium oxide, silicates, alumi-nates, silicates-aluminates).

U.S. Pat. No. 5,401,393 (1995) discloses a method for removal of metals, including mercury, from a stream of hydrocarbons, consisting in impregnation of porous polystyrene resin with elemental sulfur and heating this mixture of impregnated resin with sulfur in order to bond sulfur with mercury chemically.

U.S. Pat. No. 7,858,061 (2010) discloses a method for removal of mercury from a gaseous phase using oxidising sorbents that contain one or two silicates (e.g. montmorillonite, mica, kaolinite, zeolites, etc.) and a proper cation of an active metal (the following compounds are preferred: CuCl, $CuBr_3$ $CuCl_2$, $CuBr_2$, $CuSO_4$, $FeCl_2$, $FeCl_3$, $FeSO_4$, $Fe_2(SO_4)_3$, $ZnCl_2$, $ZnBr_2$, $NiCl_2$ and $NiSO_4$).

U.S. Pat. No. 7,507,083 (2012) discloses a method for reduction of mercury emission that originates from combusted coal, using components of a sorbent containing a halide, calcium, aluminium and silicon in various stages of the coal combustion process. The sorbents, i.e. calcium bromide, may be added before combustion of coal, and other components—to the flue gas.

U.S. Pat. No. 8,025,160 (2011) discloses a method for capture of mercury and arsenic using organically modified clay impregnated with elemental sulfur.

U.S. Pat. No. 8,236,185 (2012) discloses a method for capture of mercury using sulfurised (using such compounds as $H_2S$, $Na_2S$, $K_2S$, $(NH_4)_2S$ and $CaS_x$) red clay containing hydrated iron oxides.

Patent application No. US 2006/0205591 discloses a method for capture of mercury using compounds of iron and sulfur that contain oxygen, e.g. $Fe_2(SO_4)_3$.

Patent applications Nos. US 2010/0018395, US 2009/0117019 and US 2009/0062119 disclose methods for capture of mercury from gases by injection of sorbents based on active carbon with the surface modified by impregnation with chlorine, iodine or bromine compounds, selenium or $ZnCl_2$, which absorb mercury and are removed in dust separators together with fly ash.

The essence of the structure of the multilayer composite, according to the invention, consists in the fact that the following layers are deposited on a carrier core made of a metal or an alloy based on transition metals: the isolating layer of a transition metal nitride and an externally located sorptive layer made of a mixture of sulfides and nitrides of transition metals.

The carrier core is preferably made of iron.

Moreover, the carrier core preferably has a thickness of 0.2 to 2.5 mm.

It is further preferable that the isolating layer is made of a metal nitride, preferably iron.

It is also preferable when the isolating layer has a thickness of 0.001 to 0.04 mm.

Moreover, the sorptive layer is preferably made of iron sulfide $Fe_{1-x}S$ and iron nitride $Fe_{2-3}N$.

It is also preferable when the thickness of the sorptive layer is from 0.001 to 0.04 mm.

Furthermore, it is also preferable when the volume ratio of transition metal sulfides to nitrides in the sorptive layer is from 0.2 to 4.

The essence of the method for sorption of mercury, according to the invention, consists in the fact that during an exposition for a time period of 0.5 to 24 hours, the temperature of the multilayer composite is maintained in the range from 20 to 150° C.

The essence of the method for desorption of mercury, according to the invention, consists in the fact that the multilayer composite is heated in a stream of a flowing gas or gaseous mixture, preferably nitrogen, at a temperature of 180 to 600° C., for a time period of 3 minutes to 6 hours.

The number of sorption and desorption cycles is preferably in the range of 1 to 50.

The presented invention, while compared with the solutions quoted from the state of art, enables sorption of mercury from gaseous emissions in industrial systems, e.g. in power plants fired with a solid fuel, which causes mercury emission to the atmosphere in three main forms during combustion, such as: elementary mercury $Hg^2$, bivalent mercury $Hg^{2+}$ and mercury adsorbed on particles of fly ash. The sorptive composite, according to the invention, characterised by—thanks to its outline—low resistances of flow, may be installed successfully in chimney systems, where it performs the function of a mercury sorbent. Owing to the proposed technique of mercury desorption, the invention enables multiple use of the sorptive composite, significantly reducing the costs of flue gas purification.

EXAMPLE 1

The sorptive composite with the sorptive layer having a thickness of 0.015 mm, consisting of iron sulfide $Fe_{1-x}S$ and iron nitride $Fe_{2-3}N$, with the isolating layer having a thickness of 0.02 mm, made of iron nitride, on a carrier core having a thickness of 1 mm, made of a low-carbon steel, was exposed to a gaseous atmosphere containing vapours of mercury for 2 hours at a temperature of 50° C. As a result, an increase in the mercury content in the sorptive composite was obtained, from 0.0005% by wt. to 0.1% by wt.

EXAMPLE 2

The sorptive composite with the sorptive layer having a thickness of 0.025 mm, consisting of iron sulfide $Fe_{1-x}S$ and iron nitride $Fe_{2-3}N$, with the isolating layer having a thickness of 0.025 mm, made of iron nitride, on a carrier core having a thickness of 1.5 mm, made of a low-carbon steel, was exposed to a gaseous atmosphere containing vapours of mercury for 2 hours at a temperature of 80° C. As a result, an increase in the mercury content in the sorptive composite was obtained, from 0.0005% by wt. to 0.18% by wt.

EXAMPLE 3

The sorptive composite with the sorptive layer having a thickness of 0.03 mm, consisting of iron sulfide $Fe_{1-x}S$ and iron nitride $Fe_{2-3}N$, with the isolating layer having a thickness of 0.035 mm, made of iron nitride, on a carrier core having a thickness of 1.5 mm, made of a low-carbon steel, was exposed to a gaseous atmosphere containing vapours of mercury for 24 hours at a temperature of 100° C. As a result, an increase in the mercury content in the sorptive composite was obtained, from 0.0005% by wt. to 0.19% by wt.

EXAMPLE 4

The sorptive composite with adsorbed mercury, described in Example 2, was subjected to heating in a stream of flowing nitrogen at a temperature of 200° C. for at least 30 minutes. As a result, a decrease in the mercury content to 0.0005% by wt. was obtained.

EXAMPLE 5

The sorptive composite with adsorbed mercury, described in Example 3, was subjected to heating in a stream of flowing nitrogen at a temperature of 250° C. for at least 45 minutes. As a result, a decrease in the mercury content to 0.0005% by wt. was obtained.

EXAMPLE 6

The sorptive composite was subjected to fivefold double cycles of: sorption under the conditions described in Example 2 and desorption under the conditions described in Example 4. As a result, repeatable ranges of mercury content from 0.17-0.19% by wt. were obtained after sorption cycles and, each time, a decrease in the content to 0.0005% by wt. after desorption processes.

The invention claimed is:

1. A multilayer composite for reversible sorption of mercury, wherein the following layers are deposited on both sides of a carrier core made of a metal or an alloy based on transition metals:
   an isolating layer of a transition metal nitride and
   an externally located sorptive layer, made of a mixture of sulfides and nitrides of transition metals.

2. A multilayer composite, according to claim 1, wherein the carrier core is made of iron.

3. A composite, according to claim 1, wherein the carrier core has a thickness of 0.2 to 2.5 mm.

4. A multilayer composite, according to claim 1, wherein the isolating layer is made of iron nitride.

5. A multilayer composite, according to claim 1, wherein the isolating layer has a thickness of 0.001 to 0.04 mm.

6. A multilayer composite, according to claim 1, wherein the sorptive layer is made of iron sulfide $Fe_{1-x}S$ and iron nitride $Fe_{2-3}N$.

7. A multilayer composite, according to claim 1, wherein the thickness of the sorptive layer is from 0.001 to 0.04 mm.

8. A multilayer composite, according to claim 1, wherein the volume ratio of transition metal sulfides to nitrides in the sorptive layer is from 0.2 to 4.

9. A method for sorption of mercury from a gaseous phase, comprising exposing the multilayer composite, according to claim 1 to a multicomponent gaseous mixture containing mercury vapours or compounds, for a time period of 0.5 to 24 hours, the temperature of the multilayer composite being maintained in the range from 20 to 150° C.

10. A method for desorption of mercury from a gaseous phase, comprising heating the multilayer composite obtained by the method according to claim 9 in a stream of a flowing gas or gaseous mixture at a temperature of 180 to 600° C. for a time period of 3 minutes to 6 hours.

11. A method of reversible sorption and desorption of mercury from a gaseous phase, comprising carrying out sorption by the method of claim 8, thereby obtaining a multilayer composite sorbed with mercury, followed by heating the multilayer composite sorbed with mercury in a stream of a flowing gas or gaseous mixture at a temperature of 180 to 600° C. for a time period of 3 minutes to 6 hours, thereby obtaining a multilayer composite desorbed of mercury, wherein the number of sorption-desorption cycles is contained in the range of 1 to 50.

* * * * *